US009507158B2

(12) United States Patent  
Shikii et al.

(10) Patent No.: US 9,507,158 B2  
(45) Date of Patent: Nov. 29, 2016

(54) STEREOSCOPIC IMAGE DISPLAY APPARATUS AND STEREOSCOPIC IMAGE DISPLAY METHOD

(71) Applicant: Panasonic Corporation, Osaka (JP)

(72) Inventors: Shinichi Shikii, Nara (JP); Keiji Sugiyama, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 104 days.

(21) Appl. No.: 14/131,064

(22) PCT Filed: Jun. 7, 2013

(86) PCT No.: PCT/JP2013/003598  
§ 371 (c)(1),  
(2) Date: Jan. 6, 2014

(87) PCT Pub. No.: WO2013/187032  
PCT Pub. Date: Dec. 19, 2013

(65) Prior Publication Data  
US 2014/0118825 A1 May 1, 2014

Related U.S. Application Data

(60) Provisional application No. 61/657,931, filed on Jun. 11, 2012.

(51) Int. Cl.  
*G02B 27/22* (2006.01)  
*G02B 27/26* (2006.01)  
(Continued)

(52) U.S. Cl.  
CPC ............ *G02B 27/22* (2013.01); *G02B 27/2214* (2013.01); *G02B 27/2221* (2013.01);  
(Continued)

(58) Field of Classification Search  
CPC .............. G02B 27/22; G02B 27/2221; G02B 27/2228; G02B 27/2264; G02B 27/24  
USPC .......................... 359/464, 465; 345/32; 353/7  
See application file for complete search history.

(56) References Cited

U.S. PATENT DOCUMENTS 6,023,277 A * 2/2000 Osaka ................ G02B 27/2214  
345/419  
6,046,849 A * 4/2000 Moseley .............. G02B 5/3016  
348/57

(Continued)

FOREIGN PATENT DOCUMENTS

EP  1 001 300  5/2000  
EP  1 775 623  4/2007  
(Continued)

OTHER PUBLICATIONS

International Search Report issued Aug. 27, 2013 in International Application No. PCT/JP2013/003598.

(Continued)

*Primary Examiner* — Bumsuk Won  
*Assistant Examiner* — William R Alexander  
(74) *Attorney, Agent, or Firm* — Wenderoth, Lind & Ponack, L.L.P.

(57) ABSTRACT

A stereoscopic image display apparatus including: a light source unit; a light guide plate having an incidence surface and an emission surface; and a liquid-crystal panel which spatially modulates light. The light source unit emits the light so that the light is incident on the incidence surface in the first and second directions for the right and left eyes of a viewer, which are different from each other and each is inclined at a predetermined angle in the emission surface with respect to a reference direction perpendicular to an alignment direction of the right and left eyes of the viewer. Also, the light emitted from the emission surface of the light guide plate is in a direction which is determined according to the propagation direction of the incident light and in which a component in the alignment direction, included in the propagation direction, is maintained.

13 Claims, 11 Drawing Sheets

(51) Int. Cl.
  *G02B 27/24* (2006.01)
  *H04N 13/04* (2006.01)
(52) U.S. Cl.
  CPC ....... *G02B27/2228* (2013.01); *G02B 27/2235* (2013.01); *G02B 27/2264* (2013.01); *G02B 27/24* (2013.01); *G02B 27/26* (2013.01); *H04N 13/0418* (2013.01)

(56) References Cited

U.S. PATENT DOCUMENTS

| | | | |
|---|---|---|---|
| 7,349,160 B2 | 3/2008 | Wimberger-Friedl et al. | |
| 7,483,102 B2 | 1/2009 | Daiku | |
| 7,677,733 B2 | 3/2010 | Brott | |
| 7,800,708 B2 | 9/2010 | Brott et al. | |
| 7,855,763 B2 * | 12/2010 | Yuuki | G02B 6/0053 349/62 |
| 7,911,547 B2 | 3/2011 | Brott et al. | |
| 8,035,771 B2 | 10/2011 | Brott et al. | |
| 8,059,217 B2 | 11/2011 | Brott et al. | |
| 8,179,362 B2 | 5/2012 | Brigham et al. | |
| 8,233,113 B2 | 7/2012 | Shikii et al. | |
| 2007/0058258 A1* | 3/2007 | Mather | G02B 27/2214 359/619 |
| 2007/0076149 A1 | 4/2007 | Daiku | |
| 2007/0125971 A1 | 6/2007 | Wimberger-Friedl et al. | |
| 2008/0084512 A1 | 4/2008 | Brott et al. | |
| 2008/0084513 A1 | 4/2008 | Brott et al. | |
| 2008/0084518 A1 | 4/2008 | Brott et al. | |
| 2008/0084519 A1 | 4/2008 | Brigham et al. | |
| 2008/0086289 A1 | 4/2008 | Brott | |
| 2008/0285306 A1* | 11/2008 | Sugihara | B60K 35/00 362/617 |
| 2009/0040426 A1* | 2/2009 | Mather | H04N 13/0411 349/65 |
| 2011/0058122 A1 | 3/2011 | Shikii et al. | |
| 2011/0074939 A1* | 3/2011 | Ito et al. | 348/58 |
| 2011/0134347 A1 | 6/2011 | Brott et al. | |
| 2011/0285927 A1* | 11/2011 | Schultz et al. | 349/15 |
| 2012/0105767 A1* | 5/2012 | Choi et al. | 349/62 |
| 2012/0127573 A1* | 5/2012 | Robinson | G02B 6/0048 359/464 |

FOREIGN PATENT DOCUMENTS

| | | |
|---|---|---|
| EP | 1 988 420 | 11/2008 |
| JP | 9-146043 | 6/1997 |
| JP | 2006-501512 | 1/2006 |
| JP | 2006-184506 | 7/2006 |
| JP | 2006-234916 | 9/2006 |
| JP | 2007-94268 | 4/2007 |
| JP | 2010-506214 | 2/2010 |
| WO | 2004/031842 | 4/2004 |
| WO | 2008/045681 | 4/2008 |
| WO | 2010/116702 | 10/2010 |

OTHER PUBLICATIONS

Partial European Search Report mailed May 22, 2015 in corresponding European patent application No. 13803754.4.
Extended European Search Report issued Jul. 15, 2015 in European Application No. 13803754.4.

* cited by examiner

STEREOSCOPIC IMAGE DISPLAY APPARATUS AND STEREOSCOPIC IMAGE DISPLAY METHOD

TECHNICAL FIELD

The present invention relates to stereoscopic image display apparatuses and stereoscopic image display methods.

BACKGROUND ART

A stereoscopic image display apparatus is known by which a user can recognize stereoscopic images with his or her naked eyes. The stereoscopic image display apparatus includes a right-eye light source which emits light supposed to enter only the right eye of a user and a left-eye light source which emits light supposed to enter only the left eye of the user. Using these light sources, the stereoscopic image display apparatus repeatedly shows right-eye images to the right eye only and shows left-eye images to the left eye only in a time division manner. This allows the user to recognize the stereoscopic images.

CITATION LIST

Patent Literature

[PTL 1] Japanese Unexamined Patent Application Publication No. 2010-506214

SUMMARY OF INVENTION

Technical Problem

However, the above stereoscopic image display apparatus involves crosstalk (a proportion of the light supposed to enter the right eye which entered the left eye, or a proportion of the light supposed to enter the left eye which entered the right eye).

Thus, the present invention provides a stereoscopic image display apparatus which involves reduced crosstalk.

Solution to Problem

A stereoscopic image display apparatus according to an aspect of the present invention comprises: a light source unit configured to emit light; a light guide plate having an incidence surface on which the light emitted by the light source unit is incident and an emission surface from which incident light is emitted with a propagation direction thereof changed; and a spatial light modulator which spatially modulates the light emitted from the emission surface, wherein the light source unit is configured to emit the light to cause the light to be incident on the incidence surface in a first direction for a right eye of a viewer and in a second direction for a left eye of the viewer, the first direction and the second direction being different from each other and each being inclined at a predetermined angle in the emission surface with respect to a reference direction perpendicular to an alignment direction of the right eye and the left eye of the viewer, and the light emitted from the emission surface of the light guide plate is in a direction which is determined according to the propagation direction of the incident light and in which a component in the alignment direction, included in the propagation direction, is maintained.

It is to be noted that these general and specific aspects may be implemented using a system, a method, an integrated circuit, a computer program, or a computer-readable recording medium such as a compact disc read only memory (CD-ROM), or any combination of systems, methods, integrated circuits, computer programs, or computer-readable recoding media.

Advantageous Effects of Invention

The stereoscopic image display apparatus in the present invention allows for reduced crosstalk.

DESCRIPTION OF EMBODIMENTS

Underlying Knowledge Forming Basis of the Present Invention

In relation to the glasses-free stereoscopic image display apparatus disclosed in the [Background Art] section, the inventors of the present application found that the following problem occurs.

In recent years, the stereoscopic image display technology has drawn attention as one measure which provides more realistic images, and various companies have placed stereoscopic image display apparatuses on the market. In order to have a viewer recognize two-dimensional images as a three-dimensional image, the stereoscopic image display apparatus needs to show, only to the right eye of the viewer, an image captured by a camera corresponding to a right-eye position, and show, only to the left eye of the viewer, an image captured by a camera corresponding to a left-eye position, among images captured by two cameras (stereo cameras) spaced apart an eye-to-eye distance (about 60 mm). An exemplary method to show images to a viewer in this manner includes a shutter-glasses system and a polarized-glasses system.

In the shutter-glasses system, a right-eye image and a left-eye image are alternately displayed on a display in the time division manner, and wearing glasses designed so that no light enters the left eye when the right-eye image is displayed and no light enters the right eye when the left-eye image is displayed, a viewer can recognize a stereoscopic image.

In the polarized-glasses system, a right-eye image and a left-eye image are alternately displayed on a per pixel line basis without the time division, and light corresponding to the right-eye image and light corresponding to the left-eye image are given circular polarization in the opposite directions. A viewer who wears glasses having wave plates with different properties for the right eye and the left eye then can recognize the right-eye image only with his or her right eye and the left-eye image only with his or her left eye.

However, both the shutter-glasses system and the polarized-glasses system require users to wear glasses, which may be cumbersome, and this is why there is a demand for early implementation of a glasses-free stereoscopic display, with which a stereoscopic image can be recognized without glasses.

Figure 1:
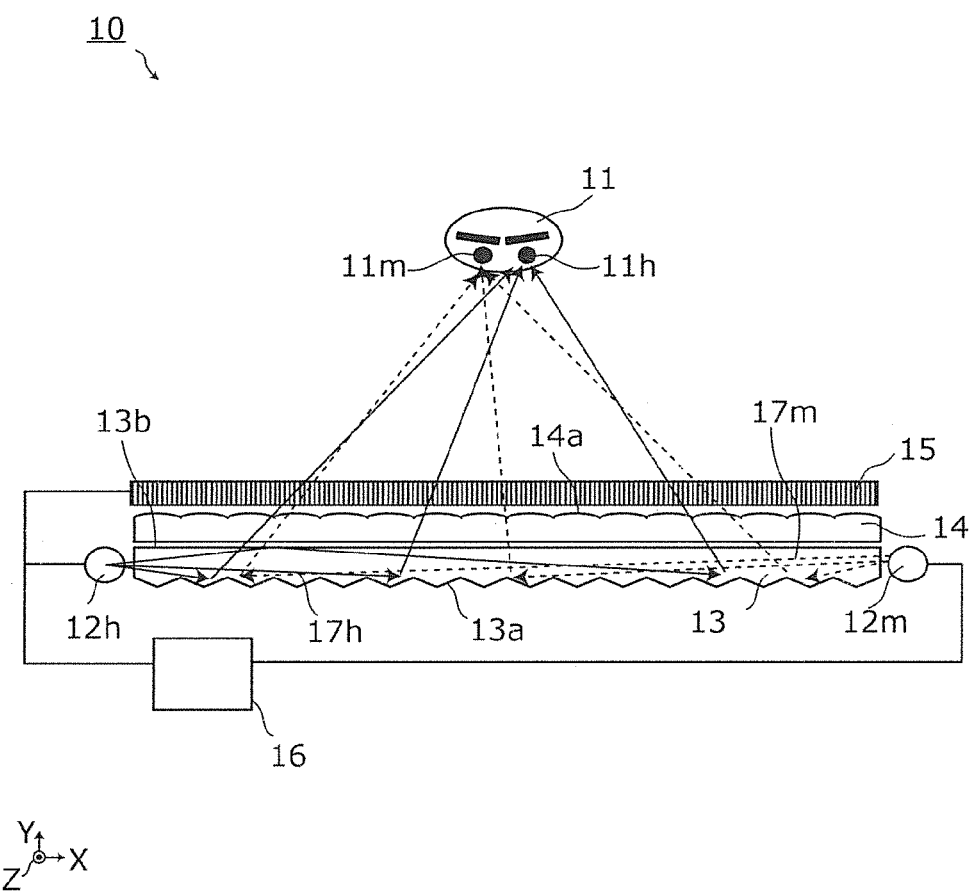
FIG. 1 shows a schematic configuration of a stereoscopic image display apparatus in the related art.

As an example of the glasses-free stereoscopic image display apparatus, the related art having a configuration as shown in Patent Literature (PTL) 1 is known. This is, for example, a configuration of a stereoscopic image display apparatus 10 shown in FIG. 1. The stereoscopic image display apparatus 10 includes: a prism sheet 13; a left-eye light source 12h which is provided to the left of the prism sheet 13 and emits light 17h; a right-eye light source 12m which is provided to the right of the prism sheet 13 and emits light 17m; a lens sheet 14 provided above the prism sheet 13; a liquid-crystal panel 15 provided as a spatial light modulator above the lens sheet 14; a right-eye light source 12m; a left-eye right source 12h; and a control unit 16 which drives the liquid-crystal panel 15.

In the stereoscopic image display apparatus 10, the light 17h emitted from the left-eye light source 12h is totally reflected off a prism 13a on the bottom of the prism sheet 13 and then is emitted upward from a principal surface 13b of the prism sheet 13 (the principal surface is referred to also as an emission surface). Next, the light 17h incident on the lens sheet 14 is focused by a lens surface 14a on the top of the lens sheet 14, passes through the liquid-crystal panel 15, and enters only a left eye 11h of a viewer 11 so that an image on the liquid-crystal panel 15 is recognized only with the left eye 11h. Likewise, the light 17m emitted from the right-eye light source 12m enters the prism sheet 13 from a right lateral end portion thereof and is totally reflected off the prism 13a on the bottom of the prism sheet 13, and the light 17m from the principal surface 13b of the prism sheet 13 enters the lens sheet 14, is focused by the lens surface 14a on the top of the lens sheet 14, passes through the liquid-crystal panel 15, and enters only a right eye 11m of the viewer 11 so that an image on the liquid-crystal panel 15 is recognized only with the right eye urn. Thus, displaying a left-eye image on the liquid-crystal panel 15 at a point in time when the left-eye light source 12h is on and the right-eye light source 12m is off, and displaying a right-eye image on the liquid-crystal panel 15 at a point in time when the right-eye light source 12m is on and the left-eye light source 12h is off are repeated sequentially to allow the viewer 11 to recognize a stereoscopic image.

However, the system of PTL 1 involves crosstalk (a proportion of the light supposed to enter one of the right and left eyes which entered the other of the right and left eyes) of 10% or so even when the prism sheet 13 and the lens sheet 14 each have an optimized shape. On the other hand, the rate of occurrence of crosstalk in a glasses-type stereoscopic image display apparatus is approximately 3%. In the system of PTL 1, it is difficult to reduce the rate of occurrence of crosstalk to approximately 3%, meaning that it is difficult to provide high quality stereoscopic images. Furthermore, in the case of magnification to a larger size, it is difficult to provide a uniform image in terms of the optical design.

The present invention solves the above-stated conventional problems and provides a display apparatus which involves reduced crosstalk and thereby is capable of displaying high quality stereoscopic images.

In order to solve such problems, a stereoscopic image display apparatus according to an aspect of the present invention comprises: a light source unit configured to emit light; a light guide plate having an incidence surface on which the light emitted by the light source unit is incident and an emission surface from which incident light is emitted with a propagation direction thereof changed; and a spatial light modulator which spatially modulates the light emitted from the emission surface, wherein the light source unit is configured to emit the light to cause the light to be incident on the incidence surface in a first direction for a right eye of a viewer and in a second direction for a left eye of the viewer, the first direction and the second direction being different from each other and each being inclined at a predetermined angle in the emission surface with respect to a reference direction perpendicular to an alignment direction of the right eye and the left eye of the viewer, and the light emitted from the emission surface of the light guide plate is in a direction which is determined according to the propagation direction of the incident light and in which a component in the alignment direction, included in the propagation direction, is maintained.

With this, the light source unit emits, at an angle for each of the right and left eyes of a viewer with respect to the reference direction, light which reaches a corresponding one of the right and left eyes. The light guide plate then directs the light emitted by the light source unit, toward the viewer, with the inclination angle of the light maintained as that at the time of the emission from the light source unit. This allows the stereoscopic image display apparatus to significantly lower the probability that the light emitted by the light source unit at the angle for the right (or left) eye of a viewer enters the left (or right) eye of the viewer. Therefore, with the stereoscopic image display apparatus, crosstalk can be reduced. Furthermore, it is possible to provide an image display apparatus and a stereoscopic image display apparatus which save space and are small in size.

For example, it may be that the light source unit (i) includes: a first light source oriented to cause a propagation direction of light emitted therefrom to be parallel to the first direction; and a second light source oriented to cause a propagation direction of light emitted therefrom to be parallel to the second direction, (ii) emits, as the light to be incident on the incidence surface in the first direction, the light emitted from the first light source, and (iii) emits, as the light to be incident on the incidence surface in the second direction, the light emitted from the second light source.

Thus, the light sources each of which emits light to a different one of the right and left eyes of the viewer are placed in the orientations for the right and left eyes of the viewer, with the result that the stereoscopic image display apparatus is capable of determining a propagation direction of the light emitted by the light source unit.

For example, it may be that the first light source emits a polarized light beam having a polarization direction parallel to a normal of the emission surface, the second light source emits a polarized light beam having a polarization direction parallel to the alignment direction, and the light source unit further includes a polarization switching element through which the light emitted by the first light source passes and the light emitted by the second light source passes with the polarization direction thereof rotated 90 degrees with respect to a propagation direction thereof.

With this, in the stereoscopic image display apparatus, the light sources emit polarized light beams different in polarization direction for the right and left eyes of the viewer, and the polarization switching element functions to make the polarization direction of these polarized light beams the same. Thus, in the stereoscopic image display apparatus, the polarized light beams having different polarization properties is used so that crosstalk can be reduced.

For example, it may be that the light source unit includes: a third light source which emits light; and a propagation direction changing unit having at least a first state and a second state and configured to allow a dynamic change between the first state and the second state, the first state being a state in which a propagation direction of the light emitted by the third light source is changed to make the light propagate in the first direction, and the second state being a state in which a propagation direction of the light emitted by the third light source is changed to make the light propagate in the second direction, the third light source emits the light when the propagation direction changing unit is in the first state and when the propagation direction changing unit is in the second state, and the propagation direction changing unit is configured to cause the light emitted by the third light source in the first state to be emitted as the light to be incident on the incidence surface in the first direction, and cause the light emitted by the third light source in the second state to be emitted as the light to be incident on the incidence surface in the second direction.

Therefore, by dynamically changing an orientation of the light emitted by the light source, the stereoscopic image display apparatus is capable of determining a propagation direction of the light emitted by the light source unit.

For example, among surfaces of the light guide plate which are adjacent to the emission surface, a surface above or below the emission surface as seen from the viewer may be the incidence surface.

With this, in the stereoscopic image display apparatus, the light emitted by the light source enters the light guide plate from, out of the surfaces thereof, the upper or lower surface as seen from the viewer.

For example, in the alignment direction, a length of the incidence surface of the light guide plate may be greater than a length of the spatial light modulator.

Thus, the light guide plate is longer in the horizontal direction than the spatial light modulator as seen from the viewer. The light emitted by the light source to each of the right and left eyes of the viewer propagates obliquely from an upper part of the light guide plate to a lower right or left part thereof as seen from the viewer. Therefore, when the light guide plate and the spatial light modulator have an equal length in the horizontal direction, the light guide plate will include, in upper parts of the left and right ends thereof, a region unreachable for light. By setting the light guide plate to be longer than the spatial light modulator, it is possible to prevent the region as above from being included.

For example, the light guide plate may further include a light absorber on a surface of the light guide plate which is adjacent to both the incidence surface and the emission surface.

With this, it is possible to reduce crosstalk which is generated by light reflected off the left and right ends of the light guide plate as seen from the viewer. The light reflected off the left and right ends of the light guide plate behaves just like the light entering a different one of the left and right eyes of the viewer and thus causes crosstalk. By absorbing such light, the light absorber can prevent the crosstalk from occurring.

For example, it may be that the emission surface has a trapezoidal shape, and a surface of the light guide plate which is adjacent to the emission surface on one of parallel long sides of the trapezoidal shape is the incidence surface.

Thus, when the light guide plate is longer in the horizontal direction than the spatial light modulator as seen from the viewer, regions of the light guide plate which are located in lower parts of the left and right ends thereof and on the outer side of the spatial light modulator are not indispensable in forming images. In other words, even the stereoscopic image display apparatus without such regions is capable of forming images just as in the case with such regions. Thus, forming the light guide plate into a trapezoidal shape by omitting such regions can result in the stereoscopic image display apparatus which saves space.

For example, it may be that the light source unit is configured to emit the light to cause a polarized light beam thereof to enter the light guide plate, the polarized light beam having a polarization direction parallel to a normal of the emission surface, the light guide plate includes a polarization and reflection surface which is adjacent to both the emission surface and the incidence surface, rotates a polarization direction of the incident light 90 degrees with respect to the propagation direction of the incident light, and reflects the incident light, and the stereoscopic image display apparatus further comprises a polarization switching element which is at a position between the light source unit and the light guide plate and on a path of light traveling toward the polarization and reflection surface and through which the light passes with a polarization direction thereof rotated 90 degrees with respect to a propagation direction thereof, the light being included in the light emitted by the light source unit and being incident on the incidence surface in the first direction.

With this, the stereoscopic image display apparatus is capable of delivering light to the entire surface of the light guide plate even when the spatial light modulator and the light guide plate have an equal length in the horizontal direction as seen from the viewer.

For example, the polarization and reflection surface may include: a reflection surface which reflects a polarized light beam incident thereon; and a quarter-wave plate which is provided on the reflection surface, and imparts, to a polarization component of the polarized light beam incident on the quarter-wave plate, a phase difference corresponding to a quarter of a wavelength of the polarized light beam, with reference to a polarization component thereof in a predetermined direction, and from which the polarized light beam resulting from the imparting is emitted, the polarization component to which the phase difference is imparted being perpendicular to the predetermined direction.

With this, the stereoscopic image display apparatus is capable of delivering light to the entire surface of the light guide plate using the reflecting surface and the quarter-wave plate as described above.

For example, the spatial light modulator may be a liquid-crystal panel.

Thus, the stereoscopic image display apparatus is capable of forming and displaying images using the spatial light modulator as the liquid crystal panel.

For example, it may be that (i) when the light enters the light guide plate in the first direction, the spatial light modulator spatially modulates the light to form an image for right eye and displays the image for right eye toward the right eye of the viewer, (ii) when the light enters the light guide plate in the second direction, the spatial light modulator spatially modulates the light to form an image for left eye and displays the image for left eye toward the left eye of the viewer, and (iii) the spatial light modulator switches in time series between displaying the image for left eye and displaying the image for right eye.

Thus, switching in time series between the image for right eye (right-eye image) and the image for left eye (left-eye image) to repeatedly show the image for right eye to the right eye of the viewer and show the image for left eye to the left eye of the viewer allows the viewer to recognize stereoscopic images.

Furthermore, a stereoscopic image display method according to an aspect of the present invention is a stereoscopic image display method performed by a stereoscopic image display apparatus including: a light source unit which emits light; a light guide plate having an incidence surface on which the light emitted by the light source unit is incident and an emission surface from which incident light is emitted with a propagation direction thereof changed; and a spatial light modulator which spatially modulates the light emitted from the emission surface, the stereoscopic image display method comprising: emitting the light to cause the light to be incident on the incidence surface in a first direction for a right eye of a viewer and in a second direction for a left eye of the viewer, the first direction and the second direction being different from each other and each being inclined at a predetermined angle in the emission surface with respect to a reference direction perpendicular to an alignment direction of the right eye and the left eye of the viewer; and emitting the light from the emission surface in a direction which is determined according to the propagation direction of the incident light and in which a component in the alignment direction, included in the propagation direction, is maintained.

By doing so, the same or like advantageous effects as those produced by the above-stated stereoscopic image display method are produced.

The following shall specifically describe an embodiment with reference to the Drawings.

It is to be noted that each embodiment described below shows a generic or specific example. The numerical values, shapes, materials, structural elements, the arrangement and connection of the structural elements, steps, the order of the steps etc. shown in the following embodiment are examples, and therefore do not intend to limit the present invention. Therefore, among the structural elements in the following embodiment, structural elements not recited in an independent claim indicating the broadest concept are described as arbitrary structural elements.

It is to be noted that the same elements are denoted by the same numerals and symbols and descriptions thereof may be omitted. In addition, the Drawings show the structural elements schematically as subjects in order to facilitate understanding.

Embodiment

Figure 2:
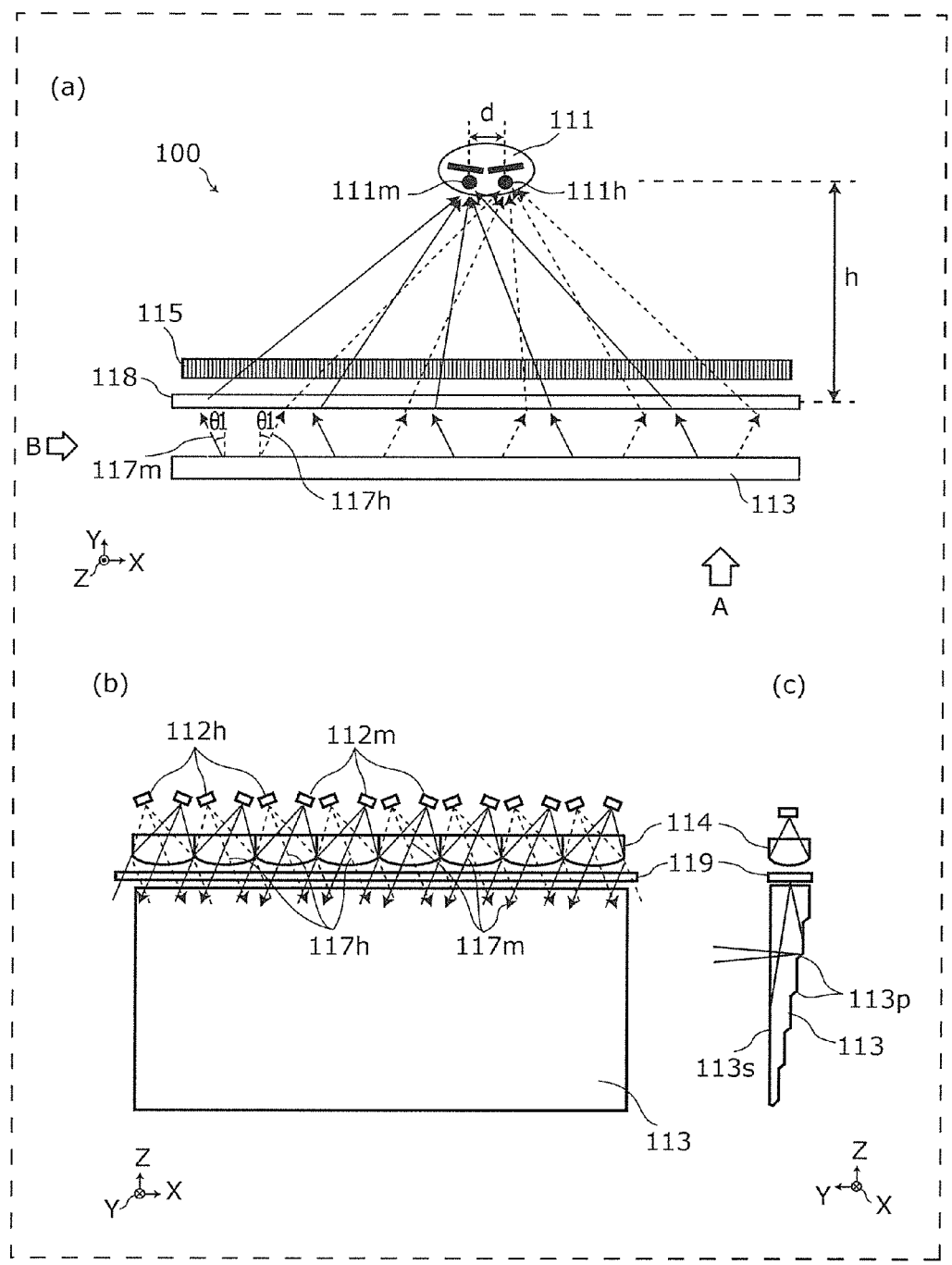
FIG. 2 shows a schematic configuration of a stereoscopic image display apparatus according to Embodiment.

FIG. 2 shows a schematic configuration of a stereoscopic image display apparatus 100 according to Embodiment.

FIG. 2 shows, in (a), a front view of the stereoscopic image display apparatus 100. FIG. 2 shows, in (b), a plan view thereof as seen from A in (a) of FIG. 2. FIG. 2 shows, in (c), a side view thereof as seen from B in (a) of FIG. 2.

The stereoscopic image display apparatus 100 includes a right-eye light source 112m, a left-eye light source 112h, a collimating lens 114, a lens array 119, a light guide plate 113, a Fresnel lens 118, a liquid-crystal panel 115, and a control unit (not shown) connected to the liquid-crystal panel 115, the right-eye light source 112m, and the left-eye light source 112h. In (b) of FIG. 2 and (c) of FIG. 2, the illustration of the Fresnel lens 118 and the liquid-crystal panel 115 is omitted. Furthermore, an X axis (X direction), a Y axis (Y direction), and a Z axis (Z direction) are defined as coordinate axes shown in FIG. 2, and an orientation thereof is represented by "+" or "−." Specifically, simple words "X direction" indicate both orientations in the direction parallel to the X axis, and words "+X direction" indicate an orientation, in the direction parallel to the X axis, in which X increases (the orientation of an arrow in the coordinate axes). In addition, the X direction is also referred to as the horizontal direction, the Y direction the depth direction, and the Z direction the vertical direction.

Figure 3:
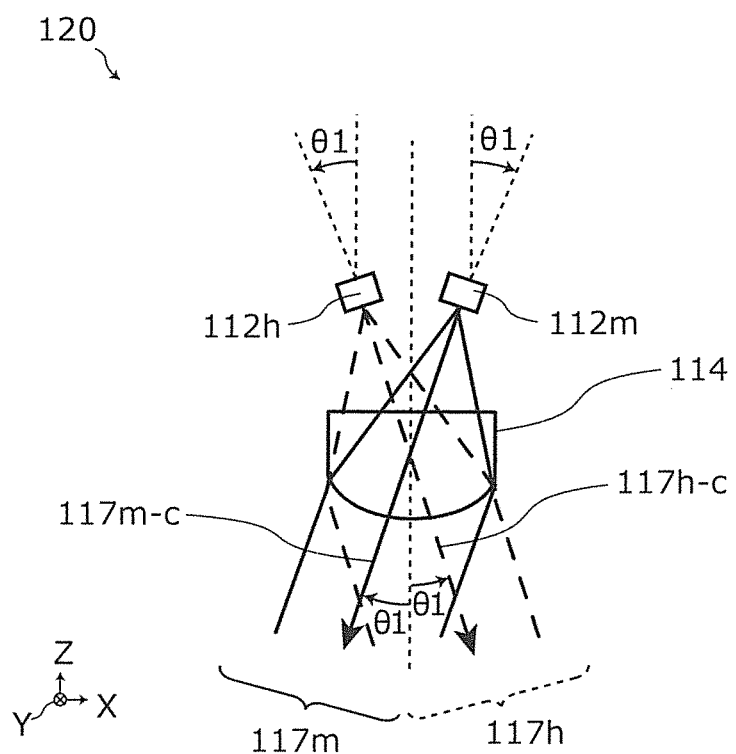
FIG. 3 shows a schematic configuration of a light source unit in the stereoscopic image display apparatus according to Embodiment.

Firstly, with reference to FIG. 3, light 117m and light 117h which are emitted by a single light source unit 120 including the single right-eye light source 112m and the single left-eye light source 112h shall be described.

As shown in FIG. 3, the right-eye light source 112m is provided at an angle of θ1 degrees on the right with respect to the lens axis of the collimating lens 114 (a reference direction). Furthermore, the right-eye light source 112m is provided so that a main light beam 117m-c of the light 117m emitted by the right-eye light source 112m is emitted from the collimating lens 114 at the angle of θ1 with respect to the lens axis of the collimating lens 114 and is emitted as substantially parallel light beams from the collimating lens 114. Likewise, the left-eye light source 112h is provided at the angle of θ1 degrees on the opposite side from the right-eye light source 112m, with respect to the collimating lens 114. Furthermore, the left-eye light source 112h is provided so that a main light beam 117h-c of the light 117h emitted by the left-eye light source 112h is emitted from the collimating lens 114 at the angle of θ1 with respect to the lens axis of the collimating lens 114 and is emitted as substantially parallel light beams. A plurality of the light source units 120 each configured as above are arranged as shown in (b) of FIG. 2. The arranged light source units 120 emit linear light the main light beam of which has an orientation at the angle of θ1 on the right with respect to the direction downward in the drawing (the −Z direction) and linear light the main light beam of which has an orientation at the angle of θ1 on the left with respect to the direction downward in the drawing (the −Z direction). The emitted light 117m and 117h enters into the light guide plate 113.

Referring back to FIG. 2, the light guide plate 113 includes a plurality of prisms 113p on the bottoms. The light 117m and 117h incident on the prisms 113p is totally reflected off the prisms 113p and then is emitted from a principal surface 113c of the light guide plate. The light 117m emitted from the light guide plate 113 is emitted as planar light at the angle of θ1 on the right with respect to the direction upward in the drawing (+Y direction), and the light 117h emitted from the light guide plate 113 is emitted as planar light at the angle of θ1 on the left with respect to the direction upward in the drawing (+Y direction), as shown in (a) of FIG. 2. The light 117m and 117h emitted as the planar light passes through the Fresnel lens 118 having a focal distance h so as to be focused on the eyes of a viewer 111 at a distance h.

Here, the angle θ1 for focusing the light on a right eye 111m or a left eye 111h of the viewer 111 at the distance h shall be discussed. For example, assuming that the mean eye-to-eye distance d of the viewer 111 is 60 mm and the distance h is 300 mm, the calculation is θ1=a tan (60 mm/2/300 mm)=5.71 degrees. Specifically, under the above assumption, the right-eye light source 112m and the left-eye light source 112h shown in FIG. 3 are each provided at an angle of 5.71 degrees with respect to the lens axis (Z axis), with the result that the light emitted by the right-eye light source 112m is focused on the right eye 111m of the viewer 111 and the light emitted by the left-eye light source 112h is focused on the left eye 111h of the viewer 111.

After passing through the Fresnel lens 118, the light 117m and the light 117h pass through the liquid-crystal panel 115 to form images, and the viewer 111 can recognize the images with the right eye 111m and the left eye 111h. At this time, the control unit turns on the right-eye light source 112m at a point in time when only the right-eye image (the image for right eye) is displayed on the liquid-crystal panel 115, with the result that the right-eye image enters only the right eye 111m. Furthermore, the control unit causes only the left-eye image (the image for left eye) to be displayed on the liquid-crystal panel 115 at a different point in time and turns off the right-eye light source 112m and turns on the left-eye light source 112h at this point in time, with the result that the left-eye image enters only the left eye 111h at this point in time. Rapid repetition of these operations allows the viewer 111 to recognize displayed images as stereoscopic images.

With the stereoscopic image display apparatus 100 configured as above, the occurrence of crosstalk can essentially reduced. The stereoscopic image display apparatus 10 in the related art (FIG. 1) causes the right-eye light source 12m and the left-eye light source 12h to emit light such that the light enters the prism sheet 13 in the horizontal direction (the X direction) of the prism sheet 13. Since the light emitted by the light source 12m and the light source 12h has various angle components, the light emitted from the prism sheet 13 also has various angle components. As a result, crosstalk occurs. In the stereoscopic image display apparatus 100 in this embodiment, the light 117h emitted from the light guide plate 113 essentially has only components of θ1 degrees rightward in the drawing (in the +X direction), and the light 117m emitted from the light guide plate 113 essentially has only components of θ1 degrees leftward in the drawing (in the –X direction), as shown in (a) of FIG. 2. Furthermore, in the stereoscopic image display apparatus 100, since the light 117h and the light 117m enter the light guide plate 113 from above (the +Z side), the light incident on the light guide plate 113 is emitted to the Fresnel lens 118 with its angle maintained, and is focused by the Fresnel lens 118 toward the viewer 11, which is a very simple configuration; there is no cause for various angle components resulting in crosstalk. With the above configuration, the stereoscopic image display apparatus 100 allows the user 11 to recognize very high quality stereoscopic images with crosstalk essentially reduced.

It is to be noted that the light guide plate 113 and the collimating lens 114 may have the lens array 119 inserted therebetween which has power in the thickness direction of the light guide plate 113 (the Y direction) as shown in (b) of FIG. 2. This makes it possible to adjust, to any width, the viewing angle of the stereoscopic image display apparatus 100 in the vertical direction (the vertical direction in the drawing of (a) in FIG. 2; the Z direction).

It is to be noted that although the light guide plate 113 in the stereoscopic image display apparatus 100 has a configuration in which the plurality of prisms 113p are provided on the bottoms of the light guide plate 113, this is not the only example; another configuration may be adopted as long as such a configuration produces the same or like advantageous effects.

Variation 1 of Embodiment

Figure 4:
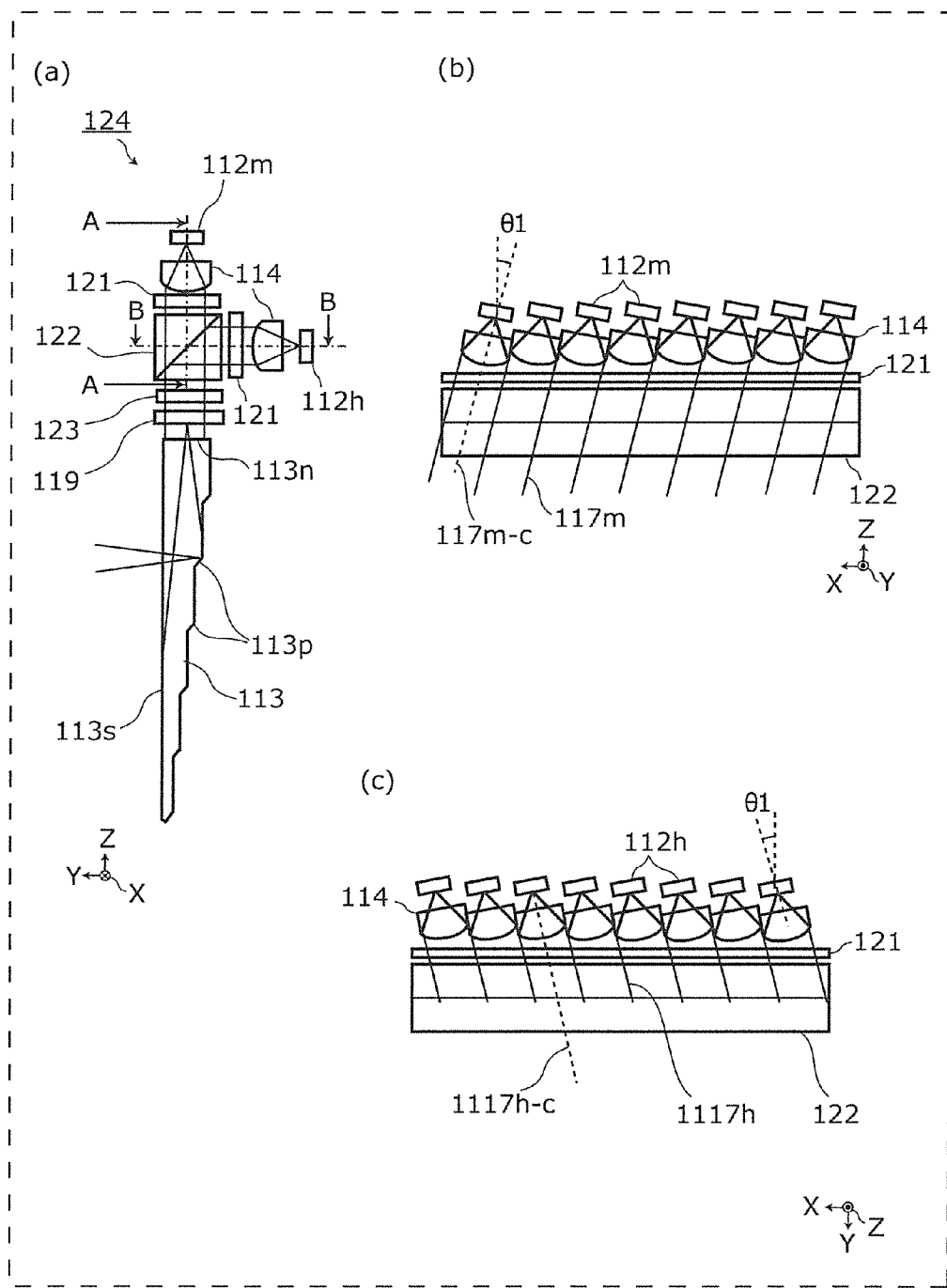
FIG. 4 shows a schematic configuration of a stereoscopic image display apparatus according to Variation 1 of Embodiment.

Next, a stereoscopic image display apparatus 124 according to Variation 1 of this embodiment shall be described with reference to FIG. 4. In the stereoscopic image display apparatus 124, an optical system which covers functions up to the point that light emitted by a light source enters the light guide plate 113 is different from that in the stereoscopic image display apparatus 100. FIG. 4 shows, in (a), a side view of the stereoscopic image display apparatus 124. FIG. 4 shows, in (b), a sectional view taken along line A-A in (a) of FIG. 4. FIG. 4 shows, in (c), a sectional view taken along line B-B in (a) of FIG. 4.

The stereoscopic image display apparatus 124 includes, in addition to the structural elements included in the stereoscopic image display apparatus 100, a polarizing plate 121, a polarization beam splitter 122, and a polarization switching element 123. In FIG. 4, the illustration of the Fresnel lens 118 and the liquid-crystal panel 115 is omitted. The Fresnel lens 118 and the liquid-crystal panel 115 in the stereoscopic image display apparatus 124 are the same as those in the stereoscopic image display apparatus 100.

Firstly, the right-eye light source 112m shall be described. FIG. 4 shows, in (b), a sectional view taken along line A-A in (a) of FIG. 4. As shown in (b) of FIG. 4, the right-eye light source 112m is provided at the angle of θ1 on the right in the longitudinal direction with respect to an incidence surface 113n of the light guide plate 113, and the collimating lens 114 is provided also at the angle of θ1 on the right in the longitudinal direction with respect to the incidence surface 113n of the light guide plate 113. The main light beam 117m-c of the light 117m is present on the lens axis of the collimating lens 114. The light 117m is converted by the collimating lens 114 into substantially parallel light beams, and the polarization components thereof parallel to the XZ plane are then absorbed by the polarizing plate 121, and only the polarization components thereof in the vertical direction in the drawing (the Y direction) pass through the polarizing plate 121 and enter the polarization beam splitter 122. Out of the incident light from the right-eye light source 112m side in (a) of FIG. 4, only light having the polarization components in the horizontal direction in the drawing (the Y direction), which is P-polarized light, passes through the polarization beam splitter 122. This means that, out of the light 117m incident on the polarization beam splitter 122, light having the polarization components in the horizontal direction in the drawing (the Y direction) in (a) of FIG. 4 passes through the polarization beam splitter 122.

Next, the left-eye light source 112h shall be described with reference to (c) of FIG. 4. FIG. 4 shows, in (c), a sectional view taken along line B-B in (a) of FIG. 4. As shown in (c) of FIG. 4, the left-eye light source 112h is provided at the angle of θ1 on the left in the longitudinal direction with respect to the incidence surface 113n of the light guide plate 113, and the collimating lens 114 is provided also at the angle of θ1 on the left in the longitudinal direction with respect to the incidence surface 113n of the light guide plate 113. The main light beam 117h-c of the light 117h is present on the lens axis of the collimating lens 114. The light 117h is converted by the collimating lens 114 into substantially parallel light beams, and the polarization components thereof in the vertical direction in the drawing (the Z direction) are then absorbed by the polarizing plate 121, and only the polarization components thereof parallel to the XY plane pass through the polarizing plate 121 and enter the polarization beam splitter 122. Out of the incident light from the left-eye light source 112h side in (a) of FIG. 4, only light having the polarization components in the vertical direction in the drawing (the X direction), which is S-polarized light, is reflected off a slope of the polarization beam splitter 122 and passes therethrough in the direction downward in the drawing in (a) of FIG. 4. This means that the light 117h from the left-eye light source 112h side, incident on the polarization beam splitter 122, is light polarized in the vertical direction in the drawing (the X direction) in (a) of FIG. 4 and is therefore reflected off the slope and emitted downward in the drawing (the −Z direction).

Next, the polarization switching element 123 shall be described. In (a) of FIG. 4, the polarization switching element 123 has a function of switching only the polarization components of incident light in the vertical direction in the drawing (the X direction) to the polarization components in the horizontal direction in the drawing (the Y direction) while being driven, and being kept from having any impact on the polarization direction of incident light while not being driven.

The following shall describe how the stereoscopic image display apparatus 124 drives the right-eye light source 112m and the left-eye light source 112h in a time division manner. Firstly, the stereoscopic image display apparatus 124 turns on only the right-eye light source 112m and stops driving the polarization switching element 123. As a result, only the polarization components in the horizontal direction in the drawing (the Y direction) in (a) of FIG. 4 enter the light guide plate 113. Next, the stereoscopic image display apparatus 124 turns on only the left-eye light source 112h and drives the polarization switching element 123. As a result, the light 117h polarized in the vertical direction in the drawing (the X direction) has its polarization direction thereof converted by the polarization switching element 123 into the horizontal direction in the drawing (the Y direction) and then enters the light guide plate 113. By doing so, when entering the light guide plate 113, the light 117m and the light 117h have the polarization directions aligned in the horizontal direction in the drawing (the Y direction) in (a) of FIG.

The light 117h and the light 117m upon entering the light guide plate 113 in the stereoscopic image display apparatus 124 are different in the following points from the light 117h and the light 117m upon entering the light guide plate 113 in the stereoscopic image display apparatus 100. In the stereoscopic image display apparatus 100, the light 117h and the light 117m are each randomly polarized light. On the other hand, in the stereoscopic image display apparatus 124, only the polarization components in the horizontal direction in the drawing (the Y direction) in (a) of FIG. 4 enter the light guide plate 113. Thus, the light 117h and the light 117m have different polarization directions.

The above difference does not affect the light use efficiency of the stereoscopic image display apparatus. This is because the liquid-crystal panel is usually provided with a polarizing plate, which therefore allows only light polarized in a predetermined direction to pass therethrough. For example, in the stereoscopic image display apparatus 100 in (a) of FIG. 2, when the liquid-crystal panel 115 absorbs the polarization components in the horizontal direction in the drawing (the X direction), the polarization components of the light 117m and the light 117h incident on the light guide plate 113 which are in the vertical direction in the drawing (the X direction) in (c) of FIG. 2 are absorbed by the polarizing plate of the liquid-crystal panel 115. On the other hand, in the stereoscopic image display apparatus 124, the polarization components to be absorbed by the liquid-crystal panel 115 have already been removed before entering the light guide plate 113, which does not affect the light use efficiency of the stereoscopic image display apparatus.

In the stereoscopic image display apparatus 124, since the orientation of the main light beams of the light 117m and the light 117h emitted respectively from the right-eye light source 112m and the left-eye light source 112h and the lens axis of the collimating lens 114 are present on the same axis as mentioned above, an aberration is less likely to be produced in the collimating lens 114, leading to reduced angle misalignment of the light being emitted from the collimating lens 114. It is therefore possible to constitute a stereoscopic image display apparatus which involves further reduced crosstalk and provides still higher quality images.

Variation 2 of Embodiment

Next, a stereoscopic image display apparatus 140 according to Variation 2 of this embodiment shall be described with reference to FIG. 5. In the stereoscopic image display apparatus 140, an optical system which covers functions up to the point that light emitted by a light source enters the light guide plate 113 is different from those in the stereoscopic image display apparatus 100 and the stereoscopic image display apparatus 124.

Figure 5:
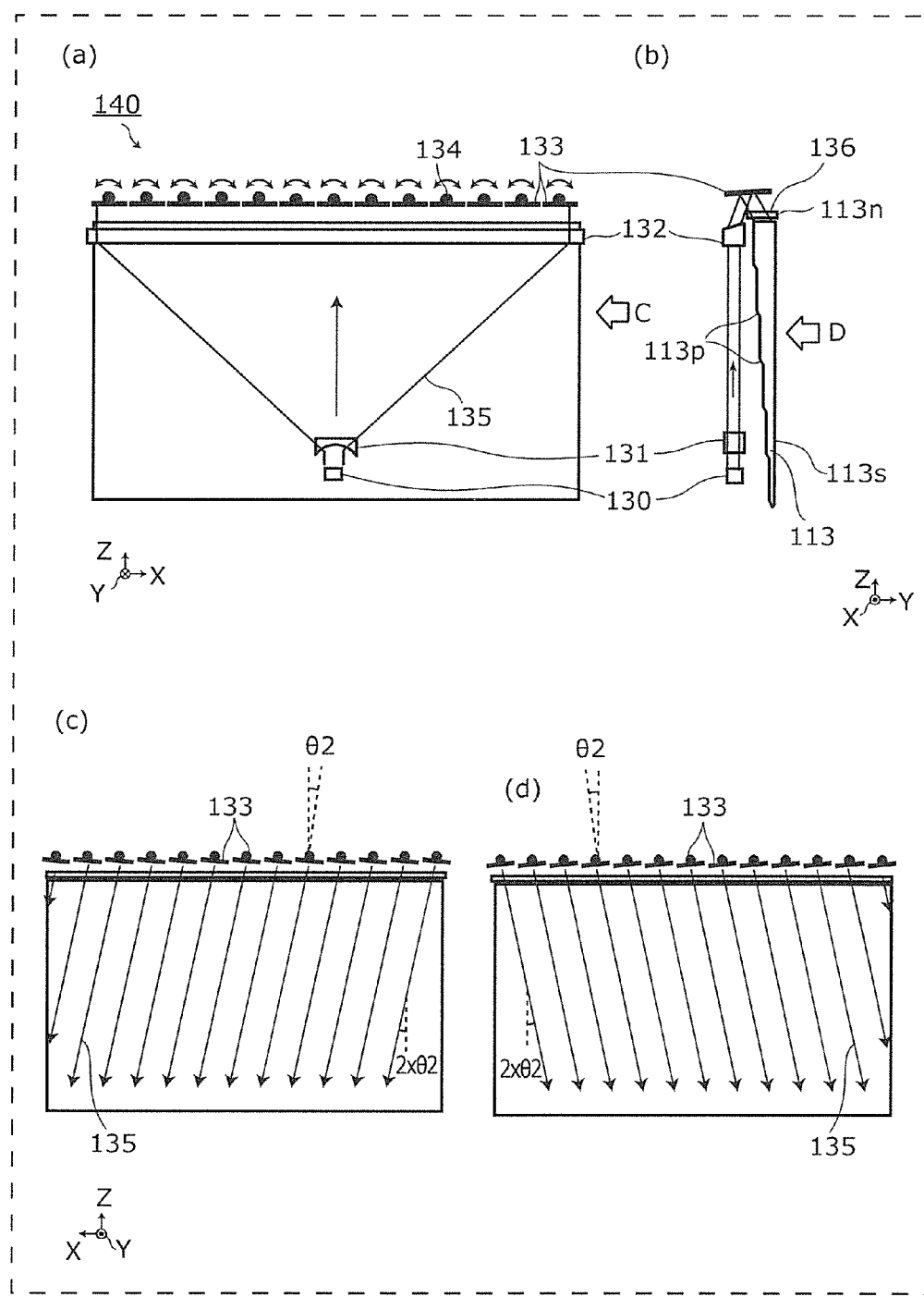
FIG. 5 shows a schematic configuration of a stereoscopic image display apparatus according to Variation 2 of Embodiment.

FIG. 5 shows, in (a), a plan view of the stereoscopic image display apparatus 140. FIG. 5 shows, in (b), a side view of the stereoscopic image display apparatus 140. FIG. 5 shows, in (c), a first schematic light path diagram inside the light guide plate 113 of the stereoscopic image display apparatus 140, and shows, in (d), a second schematic light path diagram thereof.

Firstly, with reference to (a) of FIG. 5, the optical system which covers functions up to the point that light emitted by a light source enters the light guide plate 113 in the stereoscopic image display apparatus 140 shall be described. As shown in (a) of FIG. 5, the stereoscopic image display apparatus 140 includes a light source 130, a magnifying lens 131, a Fresnel lens 132, an oscillating mirror 133, and a lens array 136. Here, since the optical system which performs a function after the light enters the light guide plate 113 is the same as that in the stereoscopic image display apparatus 100, the illustration of the Fresnel lens 118 and the liquid-crystal panel 115 is omitted in FIG. 5.

Light 135 emitted from the light source 130 enters the magnifying lens 131 and is magnified so that the light directed to the Fresnel lens 132 will have the same or approximate width as the width of the light guide plate 113 in the direction of the long side thereof (the X direction). The Fresnel lens 132 and the magnifying lens 131 are included in a beam expander; the light 135 incident on the Fresnel lens 132 remains in the form of substantially parallel light beams when entering the oscillating mirror 133. Meanwhile, as shown in (b) of FIG. 5, the magnifying lens 131 and the Fresnel lens 132 each do not have a curvature in the thickness direction of the light guide plate 113 (the horizontal direction, or the Y direction, in the drawing), which means that the light 135 incident on the Fresnel lens 132 remains in the form of substantially parallel light beams when arriving at the oscillating mirror 133.

The oscillating mirror 133 is a mirror that can be oscillated within a predetermined range of angles, with a rotation axis 134 as the center of rotation. The oscillating mirror 133 may be a galvanometer mirror or the like and may also be micro-electrode-mechanical-system (MEMS) mirrors or the like arranged in an array. The light 135 incident on the oscillating mirror 133 is reflected according to a rotation angle of the oscillating mirror. At this time, a reflection angle of the light is twice as large as the rotation angle of the oscillating mirror 133. For example, as in the stereoscopic image display apparatus 100, assuming a visual distance h=30 cm and an eye-to-eye distance d=60 mm, a rotation angle θ2 of the oscillating mirror 133 for focusing the light on the right eye of the viewer satisfies 2×θ2=5.71 degrees, therefore θ2=2.85 degrees. This means that, with the oscillating mirror 133 rotated 2.85 degrees clockwise, the stereoscopic image display apparatus 140 can focus the light on the right eye of the viewer. Furthermore, with the oscillating mirror 133 rotated 2.85 degrees counterclockwise according to the same or like calculation as above, the stereoscopic image display apparatus 140 can focus the light on the left eye of the viewer. By doing so, the stereoscopic image display apparatus 140 is capable of having light enter into the light guide plate 113 at a predetermined angle as in the case of the stereoscopic image display apparatus 100 and the stereoscopic image display apparatus 124. Thus, at a point in time when the light 135 propagates inside the light guide plate 113 with the oscillating mirror 133 rotated θ2 degrees clockwise as in (c) of FIG. 5, the liquid-crystal panel (not shown) displays a right-eye image, with the result that the right-eye image enters only the right eye of the viewer. At another point in time when the light 135 propagates inside the light guide plate with the oscillating mirror 133 rotated θ2 degrees counterclockwise as in (d) of FIG. 5, the liquid-crystal panel (not shown) displays a left-eye image, with the result that the left-eye image enters only the left eye of the viewer. When the stereoscopic image display apparatus 140 rapidly repeats the above operations on corresponding points in time, the viewer can recognize stereoscopic images. With this, it is possible to constitute a cost-saving stereoscopic image display apparatus with a reduced number of light sources.

Figure 6:
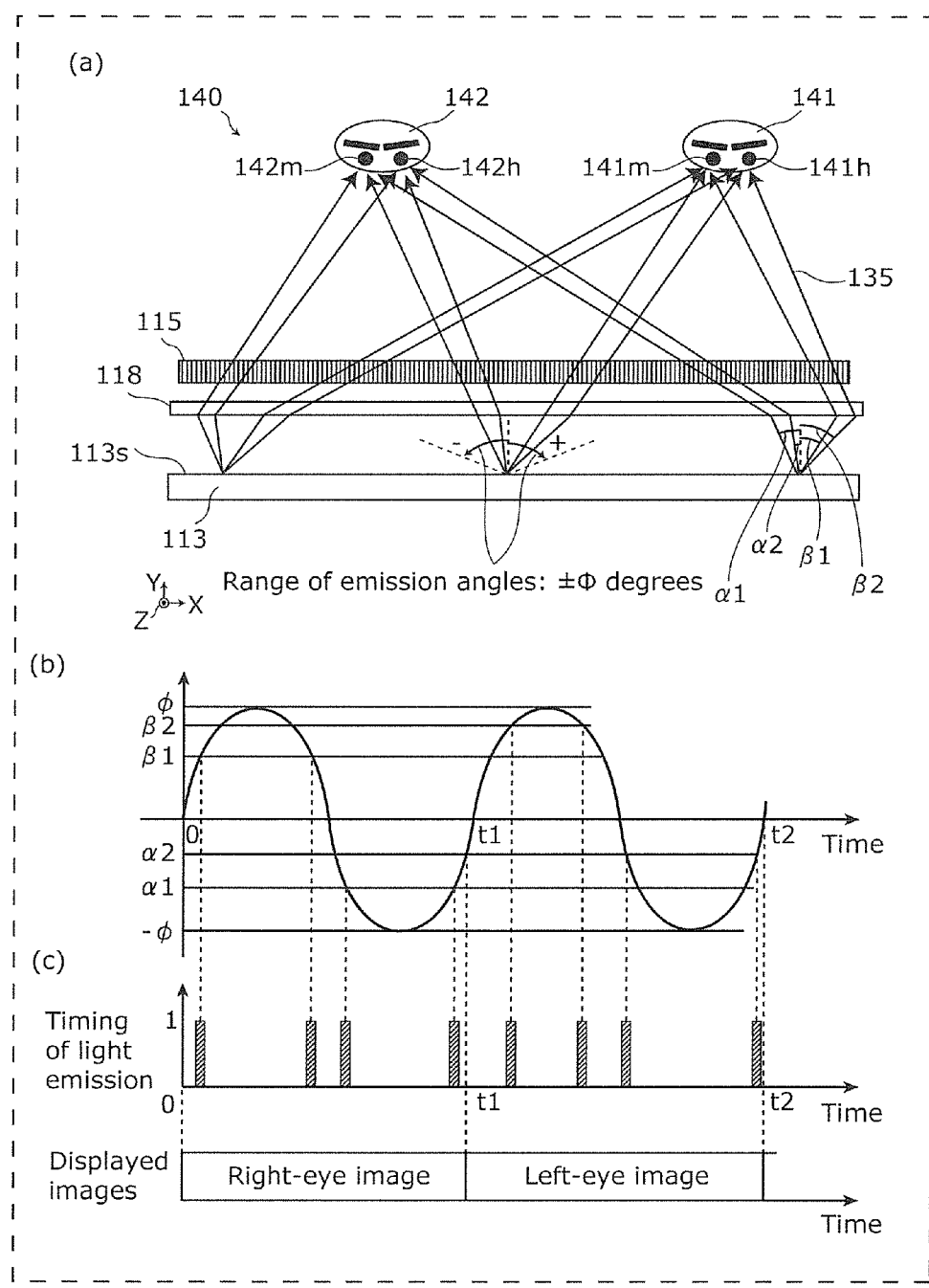
FIG. 6 explains the case where more than one person watches the stereoscopic image display apparatus according to Variation 2 of Embodiment.

The stereoscopic image display apparatus 140 allows more than one viewer to recognize stereoscopic images. FIG. 6 explains the case where more than one person watches the stereoscopic image display apparatus 140. FIG. 6 shows, in (a), a schematic configuration of the stereoscopic image display apparatus 140. FIG. 6 shows, in (b), a schematic configuration of angles of the light emitted from the light guide plate 113 of the stereoscopic image display apparatus 140. FIG. 6 explains, in (c), timing of light emission of the light source and images displayed on the liquid-crystal panel 115 in the stereoscopic image display apparatus 140.

The stereoscopic image display apparatus 140 allows more than one viewer to recognize stereoscopic images as in FIG. 6, with the oscillating mirror 133 oscillating so that the range of emission angles of the light 135 which can be emitted from the light guide plate 113 is ±φ degrees (the range of [−φ degrees, +φ degrees]), that is, the range of angles of oscillation of the oscillating mirror 133 is ±φ/2 degrees (the range of [−φ/2 degrees, +φ/2 degrees]). Assume that an emission angle of the light 135 from the light guide plate 113, necessary to cause an image to enter a right eye 142*m* of a viewer 142, is α1 degrees, an emission angle of the light 135 from the light guide plate 113, necessary to cause an image to enter a left eye 142*h* of the viewer 142, is α2 degrees, an emission angle of the light 135 from the light guide plate 113, necessary to cause an image to enter a right eye 141*m* of a viewer 141, is β1 degrees, an emission angle of the light 135 from the light guide plate 113, necessary to cause an image to enter a left eye 141*h* of the viewer 141, is β2 degrees, and all the angles α1, α2, β1, and β2 are within the range of emission angles ±φ. In (b) of FIG. 6, the horizontal axis represents time, and the vertical axis represents an angle of light emitted from a principal surface 113*s* of the light guide plate 113. FIG. 6 shows, in (c), timing of light emission of the light source 130 and images displayed on the liquid-crystal panel 115 with the horizontal axis representing time. In this case, the light source 130 is turned on at a point in time, between time 0 and time t1, when the oscillating mirror 133 reaches where the emission angle of light from the principal surface 113*s* of the light guide plate 113 corresponds to β1. In addition, the light source 130 is turned on at a point in time when the oscillating mirror 133 reaches where the emission angle of light from the principal surface 113*s* of the light guide plate 113 corresponds to α1. Furthermore, at this point in time between time 0 and time t1, a right-eye image is displayed on the liquid-crystal panel 115. By doing so, it is possible to cause only the right eye 141*m* of the viewer 141 and the right eye 142*m* of the viewer 142 to recognize the right-eye image. Moreover, the light source 130 is turned on at the next point in time, between time t1 and time t2, when the oscillating mirror 133 reaches where the emission angle of light from the principal surface 113*s* of the light guide plate 113 corresponds to β2. In addition, the light source 130 is turned on at a point in time when the oscillating mirror 133 reaches where the emission angle of light from the principal surface 113*s* of the light guide plate 113 corresponds to α2. Furthermore, at this point in time between time t1 and time t2, a left-eye image is displayed on the liquid-crystal panel 115. By doing so, it is possible to cause only the left eye 141*h* of the viewer 141 and the left eye 142*h* of the viewer 142 to recognize the left-eye image. Rapid repetition of these operations produces an advantageous effect that both the viewers 141 and 142 can recognize stereoscopic images. Also in the case where there are a larger number of persons, needless to say, as long as the range of emission angles ±φ includes angles of deflection for the right eye and the left eye of each person, turning on the light source 130 at appropriate points in time allows the person to recognize stereoscopic images no matter how many persons there are, which is an advantage.

It is to be noted that the Fresnel lens 132 may have a wedge shape in the latter stage thereof, as shown in (b) of FIG. 5, to emit the light toward the oscillating mirror 133.

Although the oscillating mirror is used here as an element which deflects light, this is of course not the only example, and another element may be adopted as long as such an element produces the same or like advantageous effects.

Variation 3 of Embodiment

Figure 7:
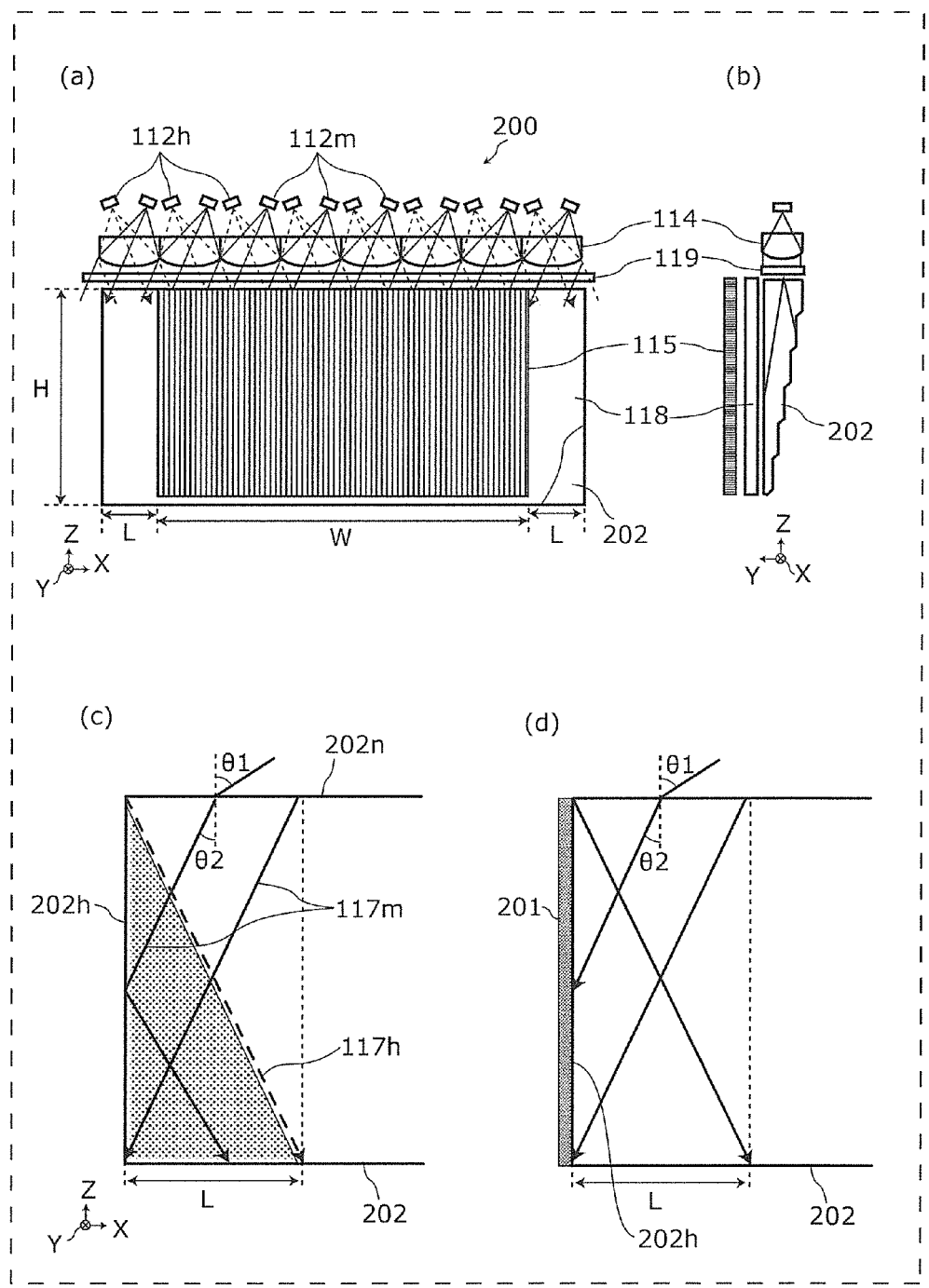
FIG. 7 shows a schematic configuration of a stereoscopic image display apparatus according to Variation 3 of Embodiment.

Next, a stereoscopic image display apparatus 200 according to Variation 3 of this embodiment shall be described with reference to FIG. 7. FIG. 7 shows, in (a), a plan view of the stereoscopic image display apparatus 200. FIG. 7 shows, in (b), a side view of the stereoscopic image display apparatus 200. FIG. 7 shows, in (c), a first schematic light path diagram inside a light guide plate 202 of the stereoscopic image display apparatus 200. FIG. 7 shows, in (d), a second schematic light path diagram inside the light guide plate 202 of the stereoscopic image display apparatus 200.

The stereoscopic image display apparatus 200 includes the same structural elements as those in the stereoscopic image display apparatus 100, but is different from the stereoscopic image display apparatus 100 in that the width of the light guide plate 202 is longer than the width W of the liquid-crystal panel 115 by L on either side, that is, by 2L in total. As in the stereoscopic image display apparatus 100, the light 117h and the light 117m which enter the light guide plate 202 form, upon the entering, the respective angles of θ1 in the opposite directions with respect to the light guide plate 202. FIG. 7 schematically shows, in (c), a left end portion of the light guide plate 202 and the light 117m and the light 117h which enter the left end portion. The light 117m which entered the left end portion of the light guide plate 202 at the angle of θ1 is refracted and thereby has an angle θ2 inside the light guide 202, and then enters and is totally reflected off a left side surface 202h of the light guide plate 202. The light 117m after totally reflected has its directions changed to the lower right in the drawing and propagates in the same direction as the light 117h. Therefore, in the area of the light guide plate 202 which covers a distance L from the left side surface thereof, the light 117h directed to the lower right in the drawing is mixed with the light 117m even at a point in time when only the light 117m mainly enters the area. Furthermore, at a point in time when the light 117h mainly enters the light guide plate 202, the light 117h which enters the light guide plate 202 from an incidence surface 202n of the light guide plate 202 cannot pass through the lower left half of the left end portion of the light guide plate 202 (the hatched region in (c) of FIG. 7). The same applies to the right end portion of the light guide plate 202 where left and right are reversed. Accordingly, with the light guide plate 202 set to have a width longer than the width W of the liquid-crystal panel by the distance L on either side as in the stereoscopic image display apparatus 200, it is possible to prevent crosstalk attributed to the mixture of the light 117m and the 117h and prevent image abnormality attributed to missing illumination, and therefore possible to constitute the stereoscopic image display apparatus 200 which displays high quality stereoscopic images.

Here, for example, when a height H of the light guide plate=150 mm, an incidence angle θ1=5.71 degrees, and a refractive index of the light guide plate 202=1.50, then θ2=3.8 degrees, L=150 mm×tan(3.8)=10.0 mm.

Furthermore, as in (d) of FIG. 7, a light absorber 201 may be provided on the left side surface 202h or the right side surface (not shown) of the light guide plate 202. With this, the total reflection on the left side surface 202h or the right side surface (not shown) can be prevented, which makes it possible to constitute the stereoscopic image display apparatus 200 which involves no crosstalk essentially and displays high quality stereoscopic images.

Variation 4 of Embodiment

Figure 8:
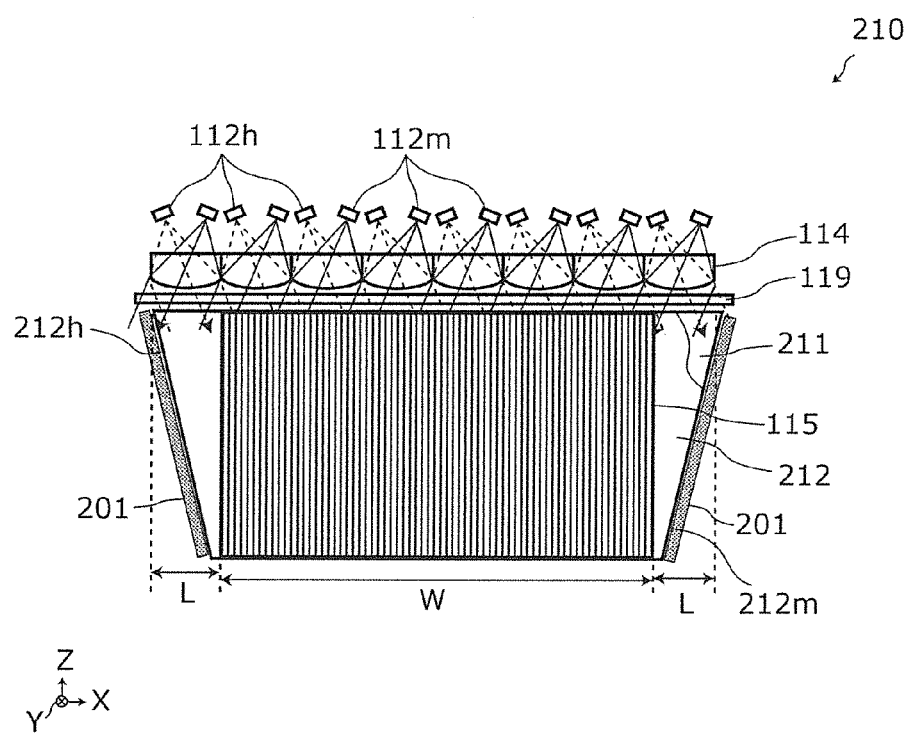
FIG. 8 shows a schematic configuration of a stereoscopic image display apparatus according to Variation 4 of Embodiment.

Next, a stereoscopic image display apparatus 200 according to Variation 4 of this embodiment shall be described with reference to FIG. 8. As shown in FIG. 8, it may be that in the stereoscopic image display apparatus 210, a light guide plate 211 and a Fresnel lens 212 each has a trapezoidal shape, and the light absorber 201 is provided on a right side surface 212m and a left side surface 212h of the light guide plate 211. With this, it is possible to remove a dead space and thereby constitute the stereoscopic image display apparatus 210 which is at a low price and small in size.

Variation 5 of Embodiment

Figure 9:
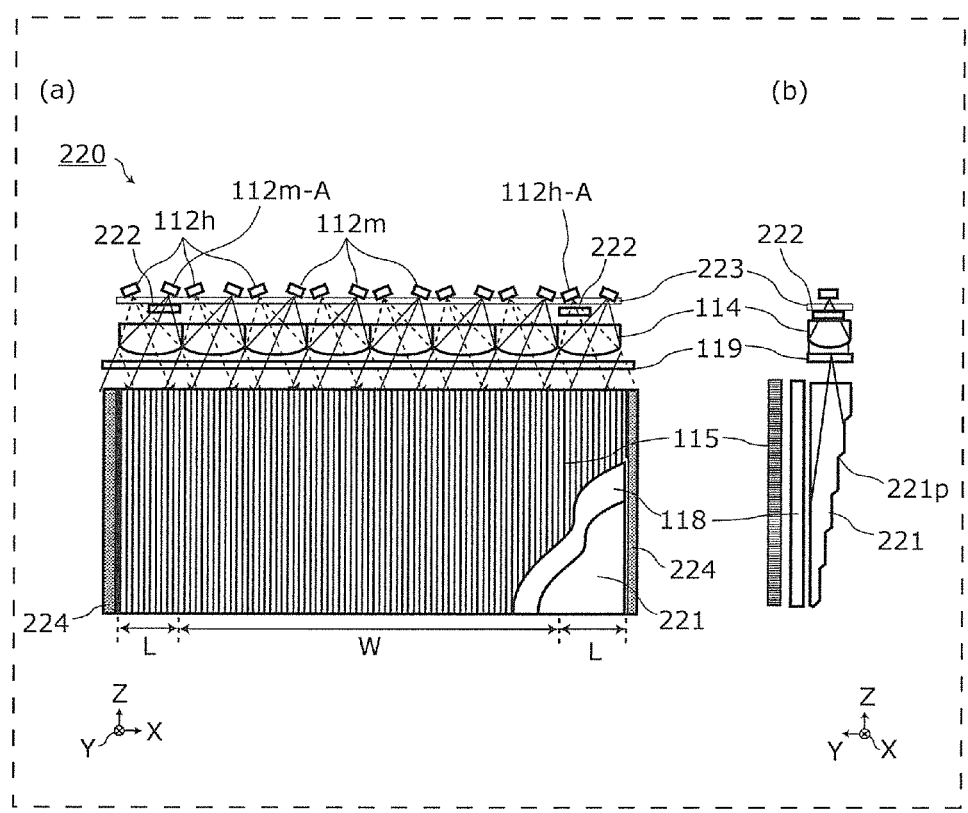
FIG. 9 shows a schematic configuration of a stereoscopic image display apparatus according to Variation 5 of Embodiment.

Next, a stereoscopic image display apparatus 220 according to Variation 5 of this embodiment shall be described with reference to FIG. 9. As shown in FIG. 9, the stereoscopic image display apparatus 220 can be a stereoscopic image display apparatus free from dead space. The stereoscopic image display apparatus 220 is substantially the same as the stereoscopic image display apparatus 100 up to the point that the light passes through the lens array 119, but is different therefrom in that a polarizing plate 223 is inserted between (i) the right-eye light source 112m and the left-eye light source 112h and (ii) the collimating lens 114. Furthermore, the stereoscopic image display apparatus 220 includes, in the regions of the light guide plate 221 which cover the distance L from either end thereof, a light source 112m-A and a light source 112h-A each of which emits light that enters the light guide plate 221 outward. Furthermore, the stereoscopic image display apparatus 220 includes a polarization switching element 222 between the polarizing plate 223 and the collimating lens 114 on the path of the light 117m and the light 117h emitted respectively from the light source 112m-A and the light source 112h-A. It is to be noted that the light source 112m-A and the light source 112h-A may be used in combination with parts of the light source 112m and the light source 112h in the stereoscopic image display apparatus 100. FIG. 9 shows a configuration of such combination.

Figure 10:
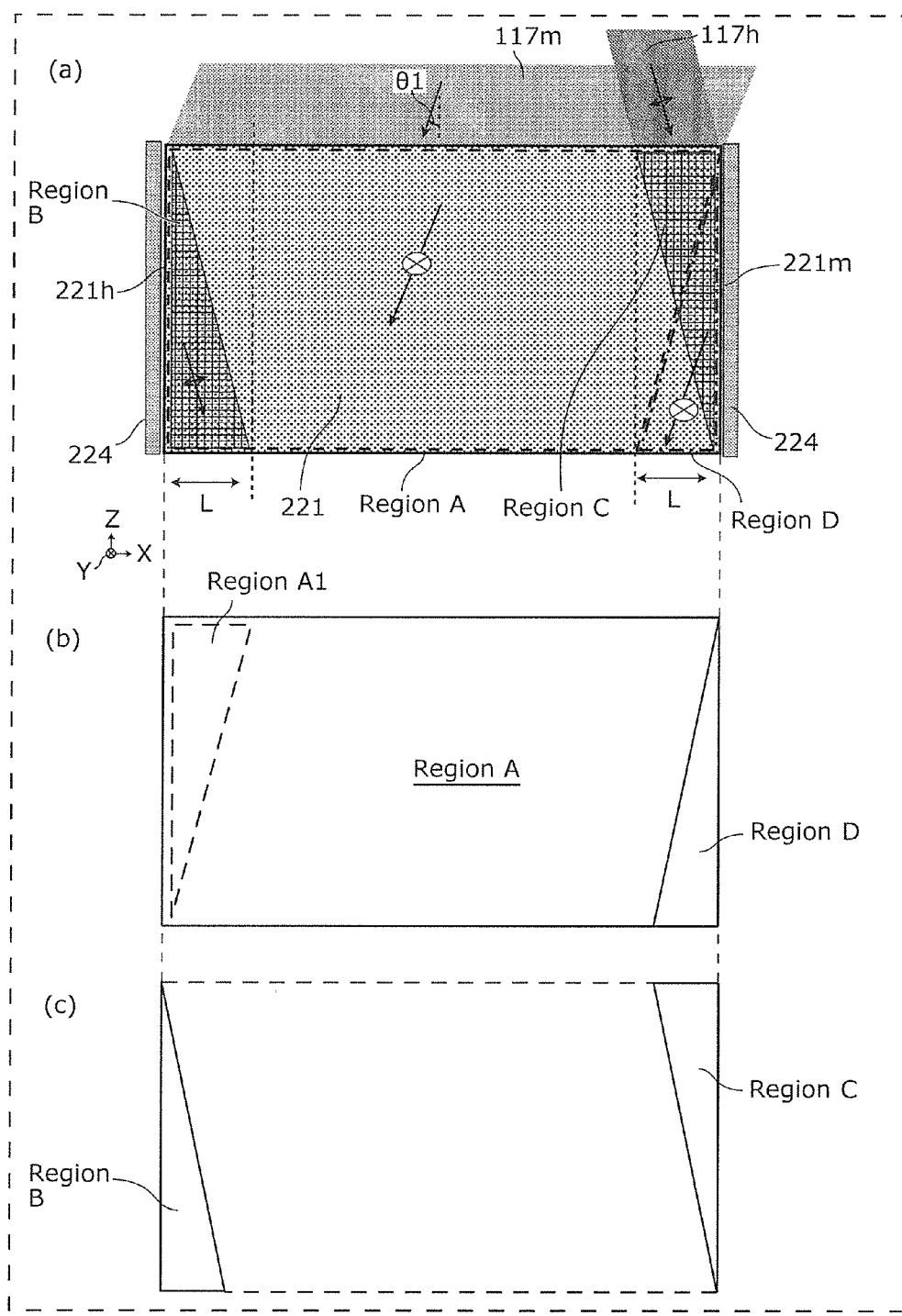
FIG. 10 explains a first light path in the stereoscopic image display apparatus according to Variation 5 of Embodiment.

A mechanism of operation of the stereoscopic image display apparatus 220 shall be described with reference to FIG. 10. FIG. 10 explains a first light path in the stereoscopic image display apparatus according to Variation 5 of this embodiment. FIG. 10 shows, in (a), a path of the light entering the right eye of a viewer. FIG. 10 shows, in (b), a region A, a region A1, and a region D in (a) of FIG. 10. FIG. 10 shows, in (c), a region B and a region C in (a) of FIG. 10.

Firstly, the case of causing light to enter only the right eye of a viewer (not shown) shall be described with reference to (a) of FIG. 10. In order to enter the right eye of the viewer, the light 117m enters the light guide plate 221 at the angle of θ1 and illuminates the region A (the trapezoidal area). Out of the light 117m, light incident on the region having the width L in the left end portion of the light guide plate 221 reaches a left side surface 221h of the light guide plate while propagating inside the light guide plate 221, and then enters a quarter-wave plate 224 and is totally reflected off a side surface thereof, thereby changing its direction to the lower right, and then passes through the quarter-wave plate 224 again, thereby propagating through the region B. At this time, as shown in the drawing, the quarter-wave plate 224 acts to cause a 90 degree rotation of the polarization direction of the light 117m with respect to the propagation direction thereof, which leaves only polarization components parallel to the XZ plane. Therefore, light totally reflected off a prism 221p and directed toward the liquid-crystal panel 115 while propagating through the region B is absorbed by the polarizing plate of the liquid-crystal panel 115. Consequently, such light does not contribute to image formation. This means that such light will not enter the left eye of the viewer, causing no crosstalk. Furthermore, at this point in time, the left-eye light source 112h-A is turned on and the polarization switching element 222 for the left-eye light source 112h-A is driven, with the result that the light 117h entering the light guide plate 221 will have only the polarization components parallel to the XZ plane in (a) of FIG. 10. Thus, out of the light 117$h$, light totally reflected off the prism 221$p$ and directed toward the liquid-crystal panel 115 while propagating through the region C (the region covering an area in which light travels before reaching a right side surface 221$m$ in the light guide plate) after entering the light guide plate 221 is absorbed by the polarizing plate of the liquid-crystal panel 115. Consequently, such light does not contribute to image formation. This means that such light will not enter the left eye of the viewer, causing no crosstalk. Furthermore, out of the light 117$h$, light having traveled back and forth to the quarter-wave plate 224 after reaching the right side surface 221$m$ has its polarization direction changed to the vertical direction in the drawing (the Y direction) when propagating through the region D. Such light propagates through the region D which the light 117$m$ failed to illuminate inside the light guide plate 221 and therefore compensates for the region A, and has a polarization direction in the vertical direction in the drawing (the Y direction), which is the same as that in the region A, therefore contributing to image formation and entering the right eye of the viewer. Thus, without creating any dead space at all, the stereoscopic image display apparatus 220 is capable of allowing the entire region of the liquid-crystal panel 115 to be recognized as an image.

Figure 11:
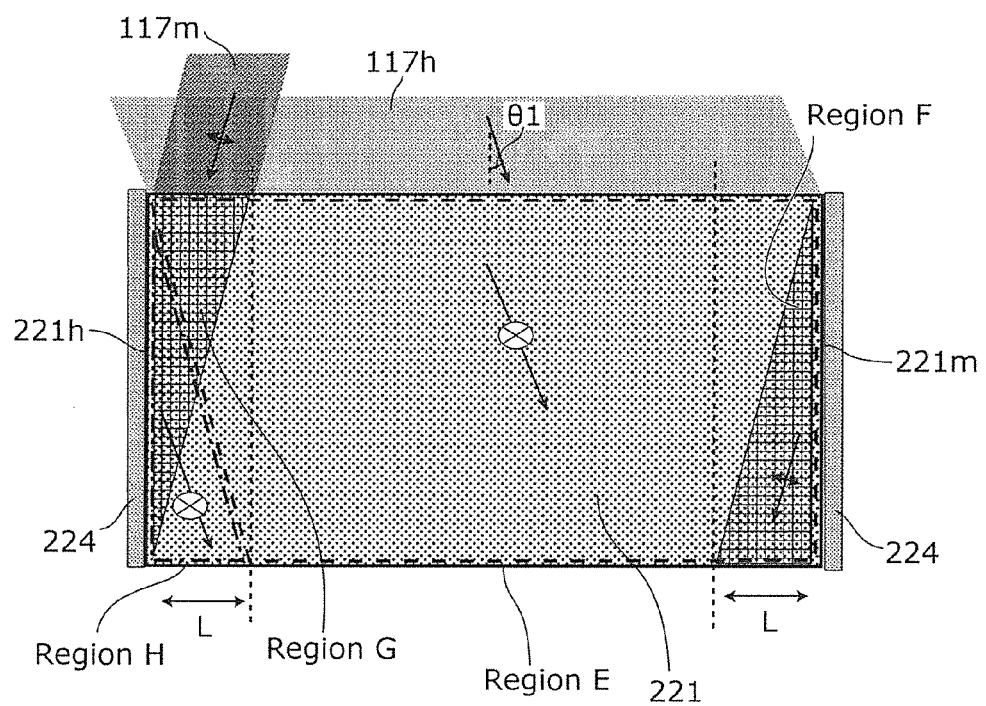
FIG. 11 explains a second light path in the stereoscopic image display apparatus according to Variation 5 of Embodiment.

FIG. 11 explains a second light path in the stereoscopic image display apparatus according to Variation 5 of this embodiment. FIG. 11 shows a path of the light entering the left eye of a viewer. With reference to FIG. 11, the case of causing light to enter only the left eye of the viewer (not shown) shall be described. In order to enter the left eye of the viewer, the light 117$h$ enters the light guide plate 221 at the angle of θ1 and illuminates the region E (the trapezoidal area). Out of the light 117$h$, light incident on the region having the width L in the right end portion of the light guide plate 221 reaches a right side surface 221$m$ of the light guide plate while propagating inside the light guide plate 221, and then enters the quarter-wave plate 224 and is totally reflected off a side surface thereof, thereby changing its direction to the lower left, and then passes through the quarter-wave plate 224 again, thereby propagating through the region F. At this time, as shown in the drawing, the quarter-wave plate 224 acts to cause a 90 degree rotation of the polarization direction of the light 117$h$ with respect to the propagation direction thereof, which leaves only polarization components parallel to the XZ plane. Therefore, light totally reflected off the prism 221$p$ and directed toward the liquid-crystal panel 115 while propagating through the region F is absorbed by the polarizing plate of the liquid-crystal panel 115. Consequently, such light does not contribute to image formation. This means that such light will not enter the right eye of the viewer, causing no crosstalk. Furthermore, at this point in time, the right-eye light source 112$m$-A is turned on and the polarization switching element 222 for the right-eye light source 112$m$-A is driven, with the result that the light 117$m$ entering the light guide plate 221 will have only the polarization components parallel to the XZ plane in FIG. 11. Thus, out of the light 117$m$, light totally reflected off the prism 221$p$ and directed toward the liquid-crystal panel 115 while propagating inside the region G (the region covering an area in which light travels before reaching a left side surface 221$h$ in the light guide plate) after entering the light guide plate 221 is absorbed by the polarizing plate of the liquid-crystal panel 115. Consequently, such light does not contribute to image formation. This means that such light will not enter the right eye of the viewer, causing no crosstalk. Furthermore, out of the light 117$m$, light having traveled back and forth to the quarter-wave plate 224 after reaching the left side surface 221$h$ has its polarization direction changed to the vertical direction in the drawing (the Y direction) when propagating through the region H. Such light propagates through the region H which the light 117$h$ failed to illuminate inside the light guide plate 221 and therefore compensates for the region E, and has a polarization direction in the vertical direction in the drawing (the Y direction), which is the same as that in the region E, therefore contributing to image formation and entering the left eye of the viewer. Thus, without creating any dead space at all, the stereoscopic image display apparatus 220 is capable of allowing the viewer to recognize the entire region of the liquid-crystal panel 115 as an image. Thus, without creating any dead space at all, the stereoscopic image display apparatus 220 can constitute a stereoscopic image display apparatus which saves space, is small in size, and provides high quality images.

It is to be noted that at a point in time when an image enters the right eye of the viewer, it is sufficient that only the polarization switching element 222 provided on the path of the light from the light source 112$h$-A is driven while the polarization switching element 222 provided on the path of the light from the light source 112$m$-A is stopped being driven so that the polarization direction is not modulated. Likewise, at a point in time when an image enters the left eye of the viewer, it is sufficient that only the polarization switching element 222 provided on the path of the light from the light source 112$m$-A is driven while the polarization switching element 222 provided on the path of the light from the light source 112$h$-A is stopped being driven so that the polarization direction is not modulated.

It is to be noted that the above-described configurations in the embodiment are each an example, and it goes without saying that various modifications can be made to these configurations without departing from the teachings of the present invention. It is also possible as a matter of course to use, in combination, the above-described configurations in the embodiment and the invention resulting from modifying the configurations.

INDUSTRIAL APPLICABILITY

The stereoscopic image display apparatus in the present invention is useful because it can constitute a stereoscopic image display apparatus which involves significantly reduced crosstalk, displays high quality images, and furthermore saves space, and is small in size and at a low price.

REFERENCE SIGNS LIST 10, 100, 124, 140, 200, 210, 220 Stereoscopic image display apparatus
11, 111, 141, 142 Viewer
11$m$, 111$m$, 141$m$, 142$m$ Right eye
11$h$, 111$h$, 141$h$, 142$h$ Left eye
12$m$, 112$m$ Right-eye light source
12$h$, 112$h$ Left-eye light source
13 Prism sheet
13$a$ Prism
13$b$ Principal surface
14 Lens sheet
15, 115 Liquid-crystal panel
16 Control unit
17$h$, 17$m$, 117$h$, 117$m$, 135 Light
117$m$-c, 117$h$-c Main light beam
113, 202, 211, 221 Light guide plate 113p, 221p Prism
113s Principal surface
113n, 202n Incidence surface
114 Collimating lens
118, 132, 212 Fresnel lens
119, 136 Lens array
120 Light source unit
121, 211, 223 Polarizing plate
122 Polarization beam splitter
123, 222 Polarization switching element
130 Light source
131 Magnifying lens
133 Oscillating mirror
134 Rotation axis
201 Light absorber
202h, 212h, 221h Left side surface
212m Right side surface
224 Quarter-wave plate

The invention claimed is:

1. A stereoscopic image display apparatus comprising:
a light source unit configured to emit light;
a single light guide plate having a single incidence surface through which the light emitted by the light source unit enters the single light guide plate, and an emission surface which is different from the incidence surface and from which incident light is emitted to outside the light guide plate with a propagation direction of the incident light changed; and
a spatial light modulator which spatially modulates the light emitted from the emission surface,
wherein the light source unit is configured to emit the light to cause the light for a right eye of a viewer to be incident on the single incidence surface in a first direction, the first direction being inclined at a predetermined angle in the emission surface with respect to a direction perpendicular to an alignment direction of the right eye and a left eye of the viewer,
the light source unit is configured to emit the light to cause the light for the left eye of the viewer to be incident on the single incidence surface in a second direction, the second direction being different from the first direction and being inclined at the predetermined angle in the emission surface with respect to a direction perpendicular to the alignment direction of the right eye and the left eye of the viewer so as to diverge from the first direction,
the light incident on the single incidence surface of the single light guide plate is emitted from the emission surface of the single light guide plate, and
an incidence angle of the light being incident on the single incidence surface and an emission angle of the light being emitted from the emission surface are equal.

2. The stereoscopic image display apparatus according to claim 1, wherein the light source unit:
(i) includes:
a first light source which emits light, and which is oriented to cause a propagation direction of the light emitted from the first light source to be parallel to the first direction; and
a second light source which emits light, and which is oriented to cause a propagation direction of the light emitted from the second light source to be parallel to the second direction,
(ii) emits the light emitted from the first light source in the first direction as the light to be incident on the incidence surface, and
(iii) emits the light emitted from the second light source in the second direction as the light to be incident on the incidence surface.

3. The stereoscopic image display apparatus according to claim 2,
wherein the first light source emits a polarized light beam having a polarization direction parallel to a normal of the emission surface,
the second light source emits a polarized light beam having a polarization direction parallel to the alignment direction, and
the light source unit further includes a polarization switching element through which the light emitted by the first light source passes, and through which the light emitted by the second light source passes with the polarization direction thereof rotated 90 degrees with respect to a propagation direction thereof.

4. The stereoscopic image display apparatus according to claim 1,
wherein the light source unit includes:
a third light source which emits light; and
a propagation direction changing unit having at least a first state and a second state and configured to allow a dynamic change between the first state and the second state, the first state being a state in which a propagation direction of the light emitted by the third light source is changed to make the light propagate in the first direction, and the second state being a state in which a propagation direction of the light emitted by the third light source is changed to make the light propagate in the second direction,
the third light source emits the light when the propagation direction changing unit is in the first state and when the propagation direction changing unit is in the second state, and
the propagation direction changing unit is configured to cause the light emitted by the third light source in the first state to be emitted as the light to be incident on the incidence surface in the first direction, and cause the light emitted by the third light source in the second state to be emitted as the light to be incident on the incidence surface in the second direction.

5. The stereoscopic image display apparatus according to claim 1,
wherein among surfaces of the light guide plate which are adjacent to the emission surface, a surface above or below the emission surface as seen from the viewer is the incidence surface.

6. The stereoscopic image display apparatus according to claim 1,
wherein in the alignment direction, a length of the incidence surface of the light guide plate is greater than a length of the spatial light modulator.

7. The stereoscopic image display apparatus according to claim 1,
wherein the light guide plate further includes a light absorber on a surface of the light guide plate which is adjacent to both the incidence surface and the emission surface.

8. The stereoscopic image display apparatus according to claim 7,
wherein the emission surface has a trapezoidal shape, and a surface of the light guide plate which is adjacent to the emission surface on one of parallel long sides of the trapezoidal shape is the incidence surface.

9. The stereoscopic image display apparatus according to claim 1, wherein the light source unit is configured to emit the light to cause a polarized light beam thereof to enter the light guide plate, the polarized light beam having a polarization direction parallel to a normal of the emission surface, the light guide plate includes a polarization and reflection surface which is adjacent to both the emission surface and the incidence surface, rotates a polarization direction of the incident light 90 degrees with respect to the propagation direction of the incident light, and reflects the incident light, and the stereoscopic image display apparatus further comprises a polarization switching element which is at a position between the light source unit and the light guide plate and on a path of light traveling toward the polarization and reflection surface and through which the light passes with a polarization direction thereof rotated 90 degrees with respect to a propagation direction thereof, the light being included in the light emitted by the light source unit and being incident on the incidence surface in the first direction.

10. The stereoscopic image display apparatus according to claim 9, wherein the polarization and reflection surface includes:

a reflection surface which reflects a polarized light beam incident thereon; and a quarter-wave plate which is provided on the reflection surface, and imparts, to a polarization component of the polarized light beam incident on the quarter-wave plate, a phase difference corresponding to a quarter of a wavelength of the polarized light beam, with reference to a polarization component thereof in a predetermined direction, and from which the polarized light beam resulting from the imparting of the phase difference is emitted, the polarization component to which the phase difference is imparted being perpendicular to the predetermined direction.

11. The stereoscopic image display apparatus according to claim 1, wherein the spatial light modulator is a liquid-crystal panel.

12. The stereoscopic image display apparatus according to claim 1, wherein (i) when the light enters the light guide plate in the first direction, the spatial light modulator spatially modulates the light to form an image for right eye and displays the image for right eye toward the right eye of the viewer, (ii) when the light enters the light guide plate in the second direction, the spatial light modulator spatially modulates the light to form an image for left eye and displays the image for left eye toward the left eye of the viewer, and (iii) the spatial light modulator switches in time series between displaying the image for left eye and displaying the image for right eye.

13. A stereoscopic image display method performed by a stereoscopic image display apparatus including: a light source unit which emits light; a single light guide plate having an incidence surface through which the light emitted by the light source unit enters the single light guide plate, and an emission surface which is different from the incidence surface and from which incident light is emitted to outside the light guide plate with a propagation direction of the incident light changed; and a spatial light modulator which spatially modulates the light emitted from the emission surface, the stereoscopic image display method comprising:

emitting the light to cause the light to be incident on the single incidence surface in a first direction for a right eye of a viewer, the first direction being inclined at a predetermined angle in the emission surface with respect to a direction perpendicular to an alignment direction of the right eye and a left eye of the viewer;

emitting the light to cause the light to be incident on the single incidence surface in a second direction for the left eye of the viewer, the second direction being different from the first direction and being inclined at the predetermined angle in the emission surface with respect to a direction perpendicular to the alignment direction of the right eye and the left eye of the viewer so as to diverge from the first direction, and emitting, from the emission surface, the light incident on the single incidence surface, wherein an incidence angle of the light being incident on the single incidence surface and an emission angle of the light being emitted from the emission surface are equal.

* * * * *